(12) United States Patent
Andersson

(10) Patent No.: US 9,611,948 B1
(45) Date of Patent: Apr. 4, 2017

(54) VALVE ASSEMBLY

(71) Applicant: Flomatic Corporation, Glens Falls, NY (US)

(72) Inventor: Allan Bo Andersson, Cambridge, NY (US)

(73) Assignee: FLOMATIC CORPORATION, Glens Falls, NY (US)

(*) Notice: Subject to any disclaimer, the term of this patent is extended or adjusted under 35 U.S.C. 154(b) by 0 days.

(21) Appl. No.: 15/009,028

(22) Filed: Jan. 28, 2016

(51) Int. Cl.
*F16K 15/18* (2006.01)
*F16K 15/02* (2006.01)
*F16K 1/22* (2006.01)

(52) U.S. Cl.
CPC ............... *F16K 15/18* (2013.01); *F16K 1/22* (2013.01); *F16K 15/026* (2013.01)

(58) Field of Classification Search
CPC .......... F16K 15/18; F16K 15/026; F16K 1/22
USPC ............................................. 137/613, 614.2
See application file for complete search history.

(56) References Cited

U.S. PATENT DOCUMENTS

| | | | | |
|---|---|---|---|---|
| 3,770,014 A * | 11/1973 | Limberg | .................... | F16K 1/22 137/454.5 |
| 5,178,185 A * | 1/1993 | Stehling et al. | ........ | F16K 15/18 137/385 |
| 6,024,121 A * | 2/2000 | Anderson | ............. | F16K 15/063 137/515.7 |
| 6,349,736 B1 * | 2/2002 | Dunmire | ................. | E03B 7/077 137/15.19 |
| 6,360,619 B1 * | 3/2002 | Schultz, Jr. | ............... | F17D 3/10 137/613 |
| 9,032,992 B2 * | 5/2015 | Andersson | ............ | F16K 15/063 137/516.29 |

* cited by examiner

*Primary Examiner* — Kevin Lee
(74) *Attorney, Agent, or Firm* — Heslin Rothenberg Farley & Mesiti P.C.

(57) ABSTRACT

A valve assembly is provided which, in one aspect, includes a check valve in series with a butterfly valve without the need for a spacer or spool piper separating the check valve and butterfly valve. In one example, check valve may include a poppet comprising a plurality of guide legs extending into the downstream portion of the check valve. Butterfly valve may include at least a portion of a rotating disk is disposed within a downstream portion of the check valve. The plurality of guide legs may include distal ends that are configured or contoured to avoid interference with the rotating disk of the butterfly valve.

8 Claims, 6 Drawing Sheets

VALVE ASSEMBLY

TECHNICAL FIELD

This invention relates generally to the field of valves, and more specifically, to a wafer style valve assembly including a butterfly valve in series with a check valve.

BACKGROUND OF THE INVENTION

High raise business or apartment complexes typically use a pressure booster pump to increase the pressure of the water coming into the building from a city's water supply. Valves are incorporated into hydraulic systems that utilize pressure booster pumps to control the flow of water by reacting to changes in the system and automatically opening or closing in response to variable pressure flow. Space and flow efficiency are some of the concerns with a typical pressure booster pump system.

SUMMARY OF THE INVENTION

The shortcomings of the prior art may be alleviated by using a wafer style check valve assembly constructed in accordance with one or more principles of the present invention. The valve assembly of the present invention may be used in any type of hydraulic or other fluid flow lines such as, for example, water, fuel, or gas lines, wells, cisterns, submersible pump applications, pumping outfits or the like. Additionally, other uses may be made of the invention that fall within the scope of the claimed invention but which are not specifically described below.

In one aspect of the invention, there is provided a valve assembly comprising a standard flange to flange wafer style check valve configuration and a butterfly valve. The check valve includes a housing that includes an inner periphery surface defining a passage therethrough between an inlet port and an outlet port. The check valve also includes a flange within the housing that divides the passage between the inlet and outlet ports into an upstream portion and a downstream portion. The flange extends circumferentially around the inner periphery surface of the housing. The flange also defines a valve seat and has an inner surface that defines a valve aperture. A poppet is positioned in the downstream portion of the passage of the housing. The poppet includes a valve disk and a plurality of guide legs extending from the valve disk towards the outlet port of the housing. The valve disk engages the valve seat of the flange and is moveable between a closed position to a fully open position. The valve disk is resiliently biased in the closed position against the valve seat to inhibit fluid flow in a first direction and allow fluid flow in an opposite direction to the first direction. A guide is mounted on the inner periphery surface of the housing. The guide guides the plurality of guide legs of the poppet as the poppet moves between the closed position and the fully open position.

In one embodiment, the butterfly valve includes a butterfly valve housing. The butterfly housing includes an inner periphery surface defining a passage therethrough between a butterfly valve inlet port and a butterfly valve outlet port. The inner periphery surface of the butterfly valve defines a butterfly valve seat. The butterfly valve housing directly attaches to the check valve housing. The check valve outlet port is in fluid communication with the butterfly inlet port. The butterfly valve also include a shaft. The shaft is rotatably mounted to the butterfly valve housing. The butterfly valve also includes a butterfly valve disk. The butterfly valve disk is mounted to the shaft. The butterfly valve disk is biased in a closed position against the butterfly valve seat to inhibit fluid flow in a first direction and allow fluid flow in an opposite direction to the first direction. In one example, at least a portion of the butterfly valve disk is disposed within the downstream portion of the check valve when the butterfly valve disk is in a fully open position.

Additional features and benefits will become apparent from the following drawings and descriptions of the invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the end of the specification. The foregoing and other objects, features, and advantages of the invention are apparent from the following detailed description taken in conjunction with the accompanying drawings in which:

DETAILED DESCRIPTION OF EMBODIMENTS OF THE INVENTION

Figure 1:
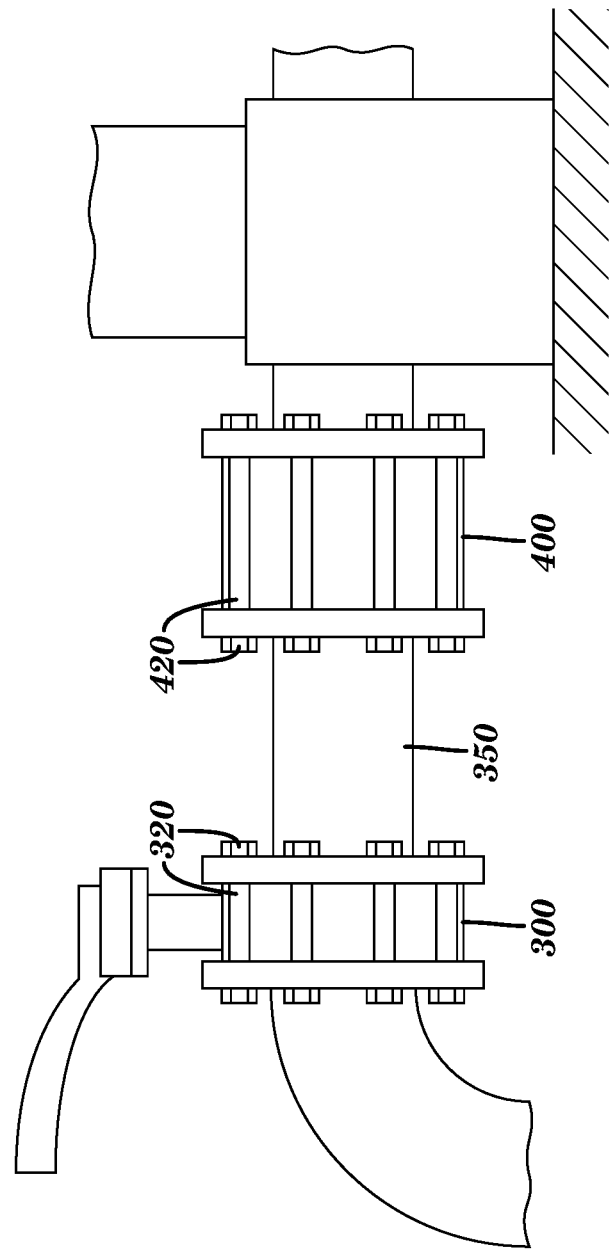
FIG. 1 depicts an example of a portion of a conventional pressure booster system for a high raise building.

For the purposes of promoting an understanding of the principles of a valve assembly designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the check valve invention relates.

Presented herein is an improved valve assembly capable of handling variable fluid flow. In traditional applications of fluid control valves, the rate of fluid flow was either very high or very low. Thus, a valve disk would always need to be positioned either in the maximum open position or the maximum closed position to operate properly. However, more recently, variable frequency drives have been used to power pumps, resulting in a variable rate of fluid flow. The variable rate of fluid flow may cause a valve to be disposed at a distance between the maximum open position and the closed position. However, traditional valves do not function properly when used in connection with these variable frequency drive pumps because the pressure exerted against the valve disk is insufficient to displace it to the maximum open position.

One type of hydraulic system that experiences variable fluid flow is a system that utilizes pressure booster pumps to control the flow of water in a high raise building. This type of system has used a valve assembly consisting of a check valve and a butterfly valve. A conventional check valve used in such a system includes a valve disk in a downstream portion of a valve connected to a stem or shaft extending away from, and not through, a valve aperture and into a downstream portion of the valve. The valve head or disk is biased, by a spring, against a valve seat forming the valve aperture. The valve disk seals with the valve seat to prevent leakage of fluid when the valve is in the closed position. The stem or shaft is telescopically received by a guide mounted on the inner surface of the valve housing in the downstream portion. The guide telescopically receives the stem or shaft as the poppet moves between an open and closed position relative to the valve seat. The guide includes a bushing in contact with the stem. A bushing is used to reduce wear on the guide and stem. An example of a valve having this configuration is described in more detail in U.S. Pat. No. 9,032,992 to Andersson, which is hereby incorporated herein by reference. However, the guide bushing used in these designs causes friction loss and results in reduced flow areas. Also, assembly of these valves requires more parts and time. The use of a valve stem in conventional check valves also includes smaller diameter shafts that fail to provide the necessary support or guiding surface to react to the changes in hydraulic pressure incurred during abrupt changes in frequency and changes in rpms of pumps used in a hydraulic system. Since the guiding surface of conventional valve stems experience significant action when used in frequency drives, the valve tends to wear out and become unstable during operation.

Current check valve designs are compromised due to a lack of stability when they are not in a fully open or fully closed position. This lack of stability in partially open positions compromises the utility of these valves in connection with pumps that employ variable frequency drives. Pumps with variable frequency drives are capable of generating varying rates of fluid flow. At times, the variable fluid flow may be capable of overcoming the force of spring required to keep the valve disk in contact with flange, but insufficient to displace valve disk to a fully open position. In traditional check valves, when a valve disk is displaced from a flange but not in a fully open position, the flow of fluid may cause the valve disk to become misaligned.

A conventional butterfly valves includes a housing that supports a shaft connected to a disk that rotates based on pressure differential from a closed position to an open positions. One typical type of a butterfly valve is a wafer style butterfly valve. A wafer style butterfly valve is designed to maintain a seal against bi-directional pressure differential to prevent any backflow in systems designed for unidirectional flow. A wafer style butterfly valve accomplishes this with a tightly fitting seal, such as, for example, a gasket, o-ring, precision machined, and a flat valve face on the upstream and downstream sides of the valve.

Figure 2:
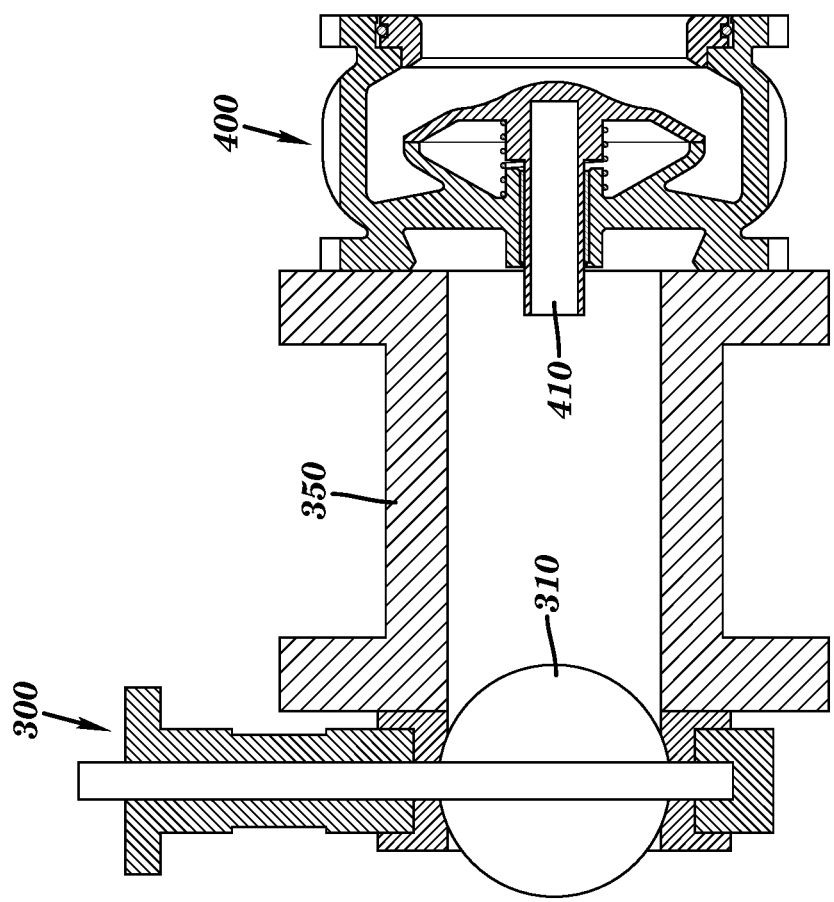
FIG. 2 a longitudinal cross-sectional view of a conventional valve system used in the pressure booster system depicted in FIG. 1 having a check valve in series with a butterfly valve requiring a spacer or spool pipe separating the two valves.

FIGS. 1 and 2 depict a prior attempt to combine a conventional check valve 400 in series with a conventional wafer style butterfly valve 300. In this example, conventional check valve 400 and a convention wafer style butterfly valve 400 could not be closely coupled. As shown in FIGS. 1 and 2, the combination of a wafer style butterfly valve 300 with a check valve 400 required the use of a spacer, such as for example, a small sectional or spool, pipe 350 to separate the check valve 400 from the butterfly valve 300. The use of spacer of spool pipe 350 required additional fasteners (e.g. bolts and nuts) to attach spacer 350 between check valve 400 and butterfly valve 400. In one example as depicted in FIG. 1, spacer or spool pipe 350 is secured to butterfly valve 400 using, for example, bolts and nuts 320 and is secured to check valve 400 by bolts and nuts 420. The use of spacer or spool pipe 350 between a butterfly valve 300 and a check valve 400 was required to allow the rotating disk 310 within butterfly valve 300 to swing or rotate fully open and not interfere with the valve stem 410 of check valve 400, as shown in FIG. 2. Spacer or spool pipe 350 also adds weight, required additional flange gaskets, and increases the overall length of this conventional valve assembly.

Figure 3:
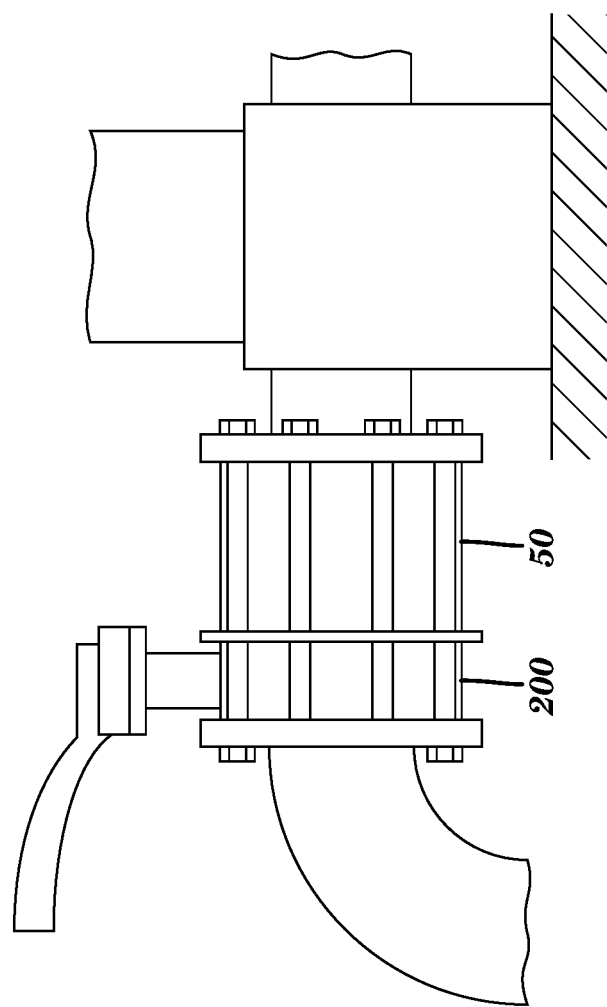
FIG. 3 depicts an example of a pressure booster system for a high raise building using a valve assembly constructed in accordance with one or more principles of the present invention.
Figure 4:
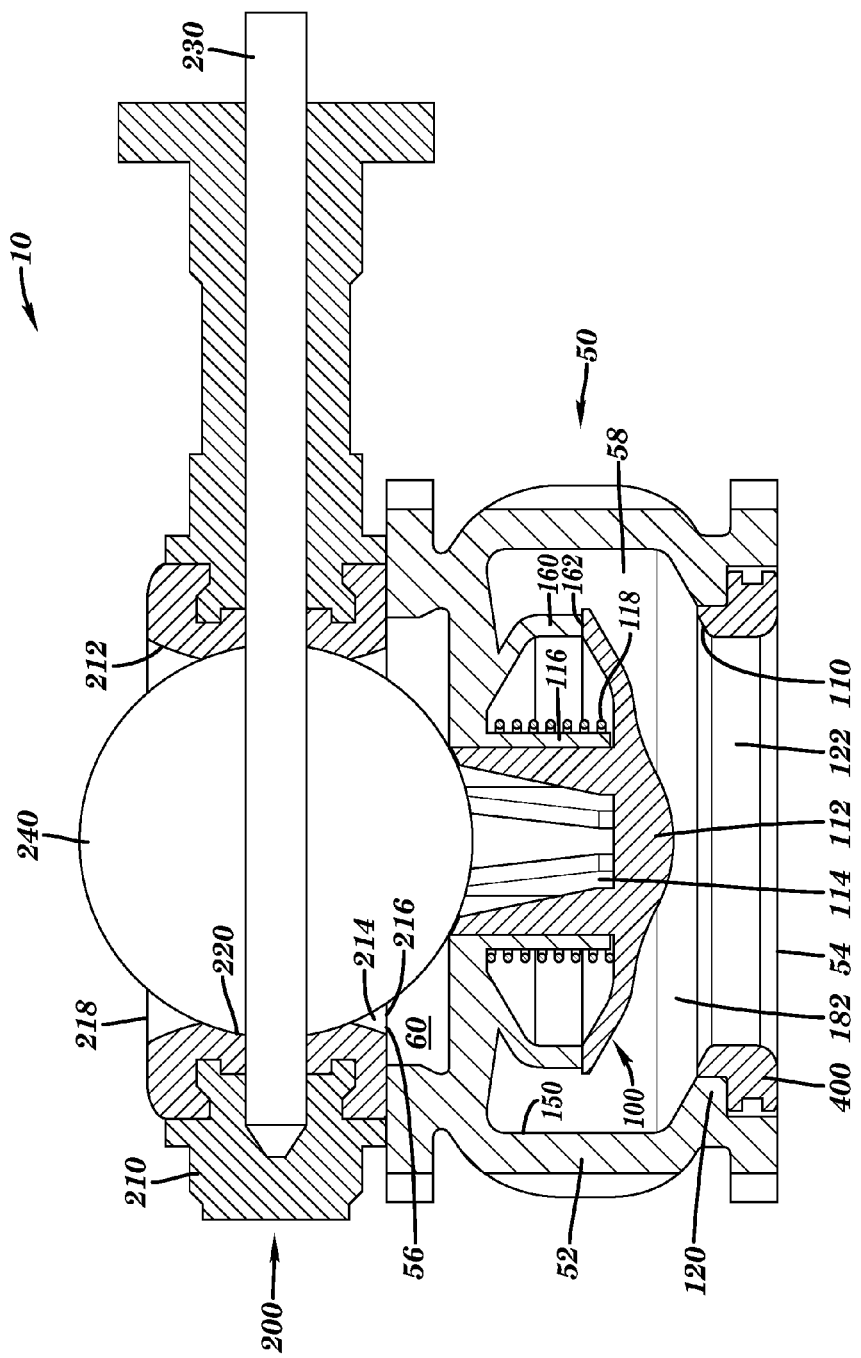
FIG. 4 depicts a longitudinal cross-sectional view of a valve system in a fully opened position including a check valve in series with a butterfly valve without a spacer or spool pipe separating the two valve constructed in accordance with one or more principles of the present invention.
Figure 5:
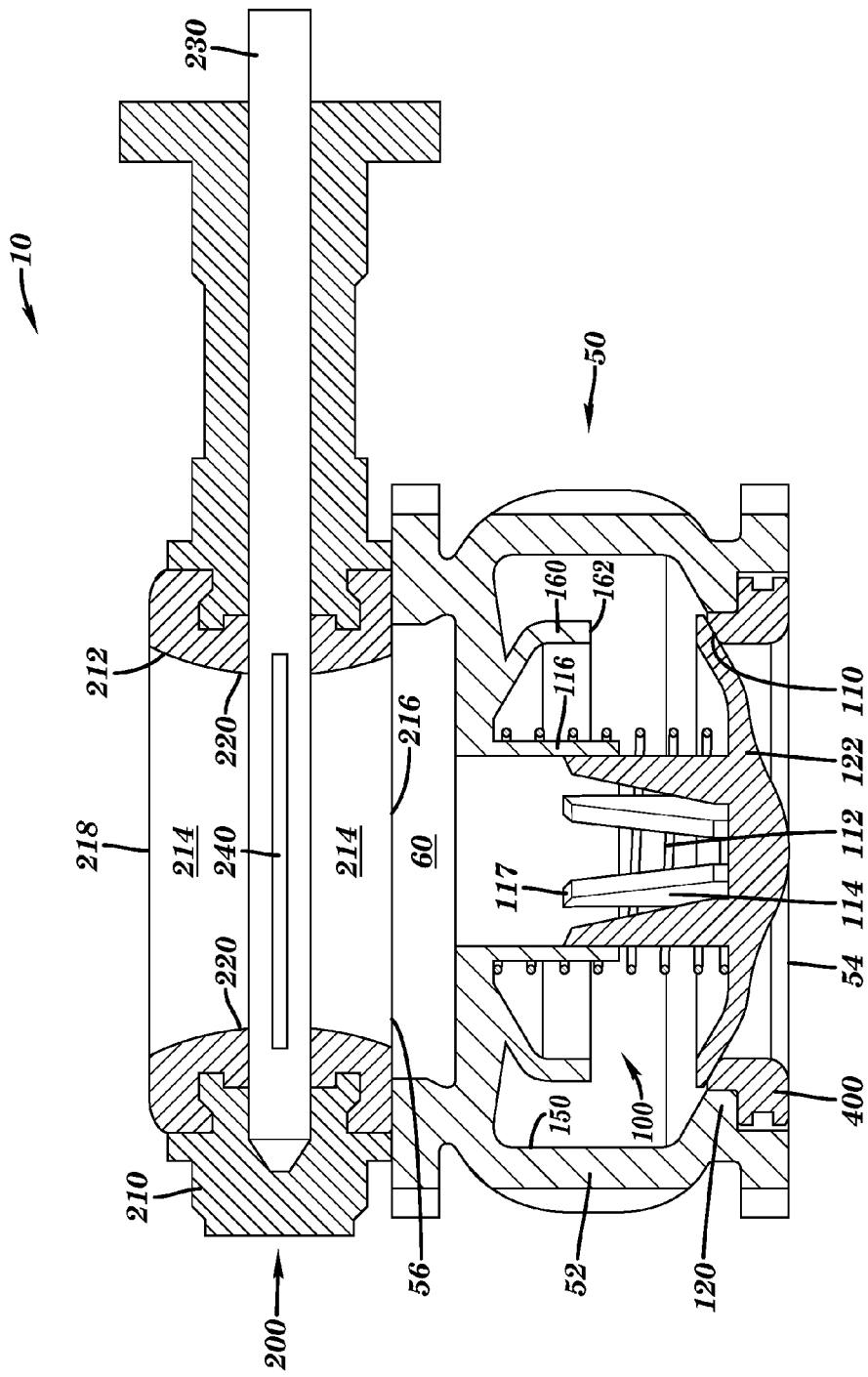
FIG. 5 depicts a longitudinal cross-sectional view of a valve system depicted in FIG. 4 in a closed position.

In the illustrative embodiment shown in FIGS. 3-5 of a valve assembly constructed in accordance with one or more aspects of the present invention, valve assembly 10 includes a check valve 50 and a wafer style butterfly valve 200. In one embodiment, check valve 50 and wafer style butterfly valve 200 may operate independently of each other regardless of flow conditions in the water or fluid system.

Check valve 50 includes a check valve tubular casing or housing 52 containing a poppet 100. Check valve housing 52 defines a passage 58 having an inlet port 54 and an outlet port 56. Valve 50 includes an upstream portion 182, generally between inlet port 54 and poppet 100, and a downstream portion 60, generally between outlet port 56 and poppet 100. Fluid enters inlet port 54, which is upstream from poppet 100 and flows towards outlet port 56, which is downstream from poppet 100. Within tubular housing 52, an inwardly extending circumferential flange 120 protruding from an inner surface 150 of the housing forms a valve aperture 122. Typically, flange 120 is circular in shape as defined by its inner surface forming valve aperture 122. However, valve aperture 122 is not limited to any particular geometrical shape. A valve seat 110 may be generally circular in shape and is formed by, for example, flange 120. In one example, valve seat 110 is angled in forty-five degrees to provide a larger seating surface and allow more seating area of valve disk or head 112.

In an alternative embodiments, check valve 50 may include a replaceable seat 400 disposed on flange 120. Seat 400 may be permanently or removably affixed to flange 120. In one embodiment, seat 400 may be disposed within housing 52 and adjacent flange 120 before poppet 100 is disposed within housing 52 such as, for example, disclosed in U.S. Pat. No. 6,024,121 to Andersson which is hereby incorporated herein by reference. Replaceable seat 400 may be removed and alternative seat 400 may be placed within housing 52. Seat 400 may be made, for example, of a material different than material of housing 52 or flange 120. For example, in one embodiment, seat 400 can be made of rubber.

Figure 6:
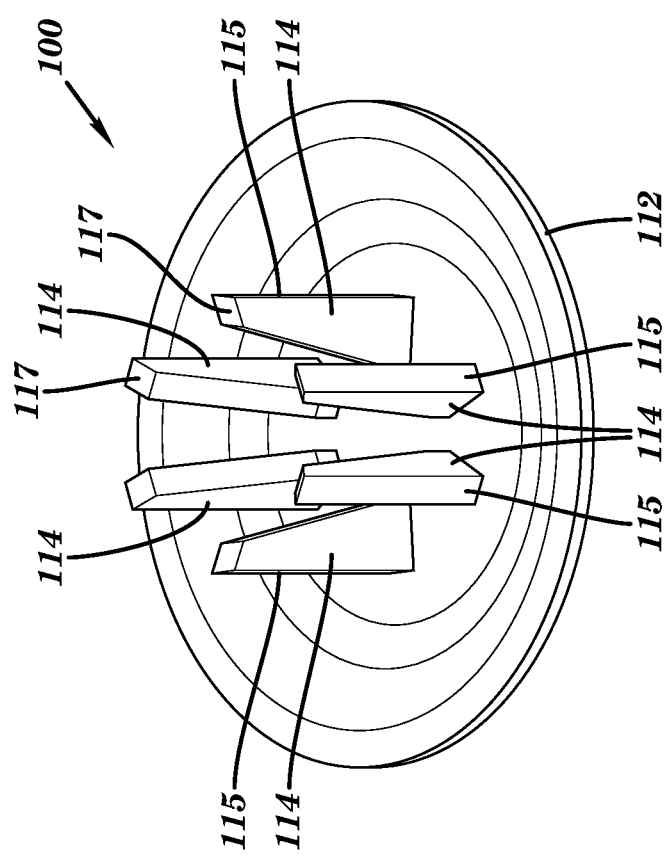
FIG. 6 depicts an example of perspective view of a poppet that could be used in the check valve shown in FIG. 4.

Poppet 100 is moveably mounted within housing 52 in passage 58 between flange 120 and outlet port 56. One example of a poppet 100 constructed in accordance with one or more aspects of the invention is depicted in FIG. 6. Poppet 100 includes a valve head or head 112 and a plurality of guide legs 114 extending from valve head or head 112 and into downstream portion 60 of tubular housing 52. In one example, the edge of the base of valve head 112 is annular, having a diameter greater than the diameter of valve seat 110. In another example, the outer surface of valve disk or head 112 facing valve aperture 122 is cone-shaped to provide more laminar flow. Downstream portion 60 may also provide a direct hydraulic closing force on poppet head 112 during valve closing and reverse flow.

Plurality of guide legs 114 of poppet 100 extend from valve head 112 into the downstream portion 60 of housing 52 of valve 50. Plurality of guide legs 114 may be formed integral with, or affixed to, valve head 112. In one embodiment, poppet 100 may include six guide legs 114, as illustrated in FIG. 6. Alternative embodiments may include more or less guide legs 114 depending on the radial support desired or required for the smooth operation of the valve. Contrary to conventional check valves, plurality of guide legs 114 extend away from valve seat 110 and do not extend through valve aperture 122. In one embodiment, plurality of guide legs 114 are telescopically received by a guide 116. Guide 116 aids in guiding the reciprocating movement of poppet 100 within housing 52 during opening and closing of valve 50. As valve head 112 moves towards and away from valve seat 110, plurality of legs 114 cooperates with the inner surface of guide 116 to maintain valve head 112 substantially in alignment with valve seat 110. For example, each of the plurality of legs 114 includes an outer surface 115 that faces the inner surface of guide 116. As poppet 100 moves between an open and closed position, the outer surfaces of the plurality of legs 114 are guided by the inner surface of guide 116.

In contrast to existing check valves that include, for example, a valve stem or shaft 410 extending from a valve head and telescopically received by a guide with a bushing as illustrated in, for example, FIG. 2, plurality of guide legs 114 result in less friction loss and provide a larger flow area when valve 50 is in an open position. The use of a plurality of guide legs 114 instead of, for example, a valve stem or shaft and guide bushing, provides quicker movement of poppet 100 which lowers hydraulic shock from water hammer surges during pump shut-down or power failure. Plurality of guide legs 114 use less material than a valve stem or shaft 410 and, therefore, can react faster to changes in frequency or pressure experienced in a hydraulic system. For example, plurality of guide legs 114 would close faster than a conventional poppet using a valve stem or shaft because the plurality of legs 114 would be lighter in weight. The use of a plurality of guide legs 114 also provide self-cleaning of the valve during, for example, reverse flow, as compared to a valve stem or shaft 410 that is closely guided in a bushing positioned in a typical guide. The use of a plurality of legs 114 guided by guide 116 as compared to a valve stem or shaft received by a bushing disposed in a guide also results in less parts (e.g. no bushing) and is easier to assemble and/or repair. The use of a plurality of legs 114 guided by guide 116 as compared to a valve stem or shaft received by a bushing disposed in a guide also results in better radial support of poppet 100 as guide legs 114 location are closer to the hydraulic flow velocity forces that act on valve head 112.

Referring to the illustrative embodiment of FIG. 5, an elastomeric spring means such as, for example, a stainless steel coil spring 118, biases valve head 112 in the closed position against valve seat 110. Spring 118 is telescoped over the outer diameter of guide 116. A first end of spring 118 is supported or, alternatively, anchored against guide 116. Opposite end of spring 118 is supported or, alternatively, anchored against valve head 112. In each of the embodiments listed above, the diameter of spring 118 is larger than the outside diameter of the plurality of guide legs 114. A spring 118 having a larger diameter spreads the force of the spring about a large area of valve head 112, resulting in a more stable resistance to the pressure of fluid against valve head 112. In one embodiment, the diameter of spring 118 is approximately three times greater than the diameter of a spring used with traditional valves. A larger spring diameter provides a biasing spring force closer to the outer edges of the valve head 112 resulting in better stability and guiding of poppet 100 during travel between a fully opened and fully closed locations when compared to traditional valves.

In one embodiment, guide 116 is removeably mounted to inner surface 150 of housing 52 in downstream portion 60 of valve 50. Guide 116 may be secured or locked in place in downstream portion 60 of valve 50 by, for example, the method described in U.S. Pat. No. 9,032,992, which is hereby incorporated herein by reference. In alternative embodiments, guide 116 may be permanently affixed to inner surface 150 of housing 52. Unlike conventional poppets that need to be fully open for proper support, guide 116 provides support to poppet 100 throughout the opening and closing of valve 50, even when valve 50 is only partially open. Also, a valve constructed in accordance with one or more principles of the present invention does not rely on a stem having guide legs extending through a valve aperture for stability and proper operation of the valve. Without use of such guide legs, poppet 100 may become lodged in or with the interior seat. In alternative embodiments, guide 116 may be removeably mounted to inner surface 150 of housing 52 in other ways, including, for example, without the use of a guide ring or by using other means not illustrated such as, for example, using other fasteners, such as, for example, screws, rivets or the like, heat shrinking, shrink fitting, press fitting, snap fitting and the like.

In one embodiment, check valve 50 may include a valve head stop 160 disposed in the housing. When the valve is fully open and when the flow velocities and the hydraulic forces are the highest on valve disc 112, valve disc 112 is fully supported on the peripheral back edge 115 by valve head stop 160. As shown in FIG. 4, valve head stop 160 contacts valve head 112 in the fully open position and prevents valve head 112 from moving further into downstream portion 60. In an alternative embodiment, valve head 112 may be prevented from moving further into downstream portion 60 by the end portion 162 of guide 116. In one such example, guide 116 may be equipped with a skirt shaped surface designed to support valve head 112 in the fully opened position and also prevent vortex forces from working on the backside 113 of valve head 112. A guide 116 having a skirt shaped surface will limit cavitation and provides improved stability as valve head 112 moves between an open position and a closed position, especially during high flow velocities. In one embodiment, the cross section flow surface area of check valve 50 is equal to or larger than any point then the nominal pipe size stimulating laminar flow and results in approximately thirty to fifty percent lower friction losses across check valve 50.

As shown in FIGS. 4 and 5, butterfly valve 200 includes a butterfly housing 210, a shaft 230 and a valve disk 240. Butterfly valve housing 210 includes an inner periphery surface 212 defining a passage 214 therethrough between a butterfly valve inlet port 216 and a butterfly valve outlet port 218. Inner periphery surface 212 defines a butterfly valve seat 220. Shaft 230 is rotatably mounted to butterfly valve housing 210. Butterfly valve disk 240 is mounted to and rotates with shaft 230 based on the pressure differential on either side of valve disk 240. Valve disk 240 is biased in a closed position against the butterfly valve seat 220 to inhibit fluid flow in a first direction and allow fluid flow in an opposite direction to the first direction.

As illustrated in FIGS. 3-5, butterfly valve housing 210 attaches directly to check valve housing 52 without the need or use of a spacer or spool pipe 350 as depicted in FIGS. 1 and 2. When connected, as depicted in FIGS. 3-5, check valve outlet port 56 is in fluid communication with the butterfly inlet port 216 and at least a portion of butterfly valve disk 240 is disposed within downstream portion 60 of check valve 50 when butterfly valve disk 240 is in a fully open position (see, e.g., FIG. 4). To accommodate this configuration, plurality of guide legs 114 of check valve 50 may be configured to allow rotation of butterfly valve disk 240 in downstream portion 60 of check valve 50 when butterfly valve 200 is in a fully open position. In one embodiment as illustrated in FIG. 6, distal ends 118 of each guide legs 114 of poppet 110 extending into downstream portion 60 may be contoured to the outer peripheral shape of valve disk 240 to avoid contact or disruption with valve disk 240 of butterfly valve 200 when check valve 50 is in the fully open position. In another example, the length of each guide legs is configured to prevent contact or disruption with valve disk 240 in the fully open position, allowing valve disk 240 to swing into at least a portion of downstream portion 60 of check valve 50.

Referring now to the embodiment depicted in FIG. 4, valve assembly 10 is shown in a fully open position. In this example, check valve head 112 of poppet 100 is disengaged from valve seat 110 of flange 120 and valve disk 240 of butterfly valve 200 is rotated away from butterfly valve seat 220 and a portion of valve disk 240 is disposed in downstream portion 60 of check valve 50. Fluid passes through valve aperture 54 through downstream portion 60 and out outlet port 56 of check valve 50 and in through inlet port 216 of butterfly valve 200 and past the opening between valve disk 240 and valve seat 220 of butterfly valve 200. As the force exerted by water pressure on valve head 112 diminishes and cannot overcome the force exerted by spring 118 of check valve 50 and the biasing force of valve disk 240 against valve seat 220 of butterfly valve 200, as depicted in FIG. 5, then valve head 112 is biased into engagement with valve seat 110 of flange 120 of check valve 50 and valve disk 240 is biased and engages valve seat 220 of butterfly valve 200. In FIG. 5, valve assembly 10 is depicted in a fully closed position.

Valve assembly operates in the usual manner of a typical valve assembly using a check valve in series with a butterfly valve to provide an opening for fluid flow when the pressure in upstream portion 182 of valve housing 52 is sufficient to overcome the force imposed on valve head 112 by spring means and to be closed by action of spring means when the pressure upstream of the valve is decreased.

A valve assembly constructed in accordance with one or more aspects of the present invention avoids the need for a spacer or spool pipe between a check valve and a butterfly valve used in series in, for example, a pressure booster pumping system. Testing of valve assemblies constructed in accordance with one or more aspects of the present invention have shown thirty to seventy percent more flow efficiency than traditional valve assemblies using a spacer or spool pipe. Without use of a spacer or spool pipe, a valve assembly constructed in accordance with one or more aspects of the present invention is shorter in length, lighter, uses less materials (e.g. avoids an additional set of bolts and nuts), is easier to manufacture, and less expensive to make. A pumping system using such a valve assembly is more compact by including, for example a more compact foot print and narrower pump based or skid.

While embodiments of the invention have been illustrated and described in detail in the disclosure, the disclosure is to be considered as illustrative and not restrictive in character. All changes and modifications that come within the spirit of the invention are to be considered within the scope of the disclosure.

The invention claimed is:

1. A valve assembly, said valve assembly comprising:
a check valve, said check valve including:
   a check valve housing, said check valve housing including an inner periphery surface defining a passage therethrough between a check valve inlet port and a check valve outlet port;
   a flange within said check valve housing dividing the passage between the check valve inlet and check valve outlet ports into an upstream portion of said check valve and a downstream portion of said check valve, said flange extending circumferentially around the inner periphery surface of said check valve housing, the flange defining a check valve seat and having an inner surface defining a check valve aperture;
   a poppet positioned in the downstream portion of the passage of said check valve housing, said poppet including a valve head and a plurality of guide legs extending from the valve head towards the check valve outlet port of said check valve housing, the valve head engaging the valve seat of said flange and moveable between a closed position to a fully open position, the valve head being resiliently biased in the closed position against the check valve seat to inhibit fluid flow in a first direction and allow fluid flow in an opposite direction to the first direction; and
   a guide mounted on the inner periphery surface of said check valve housing, said guide guiding the plurality of guide legs of said poppet as said poppet moves between the closed position and the fully open position; and
a butterfly valve, said butterfly valve including:
   a butterfly valve housing, said butterfly housing including an inner periphery surface defining a passage therethrough between a butterfly valve inlet port and a butterfly valve outlet port, the inner periphery surface of said butterfly valve defining a butterfly valve seat, said butterfly valve housing directly attached to the check valve housing, wherein the check valve outlet port is in fluid communication with the butterfly inlet port;
   a shaft, said shaft rotatably mounted to said butterfly valve housing; and
   a butterfly valve disk, said butterfly valve disk mounted to said shaft, the butterfly valve disk being biased in a closed position against the butterfly valve seat to inhibit fluid flow in a first direction and allow fluid flow in an opposite direction to the first direction, wherein at least a portion of said butterfly valve disk is disposed within the downstream portion of said check valve when said butterfly valve disk is in a fully open position.

2. The valve assembly of claim 1, wherein the plurality of guide legs of said check valve are configured to allow rotation of at least a portion of said butterfly valve in the downstream portion of said check valve housing when said butterfly valve is in a fully open position.

3. The valve assembly of claim 1, wherein the plurality of guide legs of said check valve include distal ends, wherein the distal ends are contoured to allow rotation of at least a portion of said butterfly valve in the downstream portion of said check valve when said butterfly valve is in a fully open position.

4. The valve assembly of claim 1, wherein said check valve and said butterfly valve can operate independently of each other regardless of flow conditions.

5. The valve assembly of claim 1, wherein said check valve is self-cleaning between an inner surface of said guide and outer surfaces of said plurality of guide legs during reverse flow while said poppet is partially open.

6. The valve assembly of claim 1, wherein a cross section flow surface area of said check valve is equal to or larger at any point than a nominal pipe size stimulating laminar flow and results in between thirty to fifty percent lower frication losses across said check valve.

7. The valve assembly of claim 1, wherein the downstream portion of said check valve provides a direct hydraulic closing force on said poppet during closing of said check valve and reverse flow.

8. The valve assembly of claim 1, wherein said plurality of guide legs are configured in proximity to hydraulic flow velocity forces acting on the valve head of said poppet.

* * * * *